(12) United States Patent
Hight

(10) Patent No.: US 10,589,569 B2
(45) Date of Patent: Mar. 17, 2020

(54) HAND LIFT SYSTEM FOR POSITIONING A WHEEL AND TIRE TO BE PLACED ON A VEHICLE HUB

(71) Applicant: Jackie L. Hight, Eden, TX (US)

(72) Inventor: Jackie L. Hight, Eden, TX (US)

( * ) Notice: Subject to any disclaimer, the term of this patent is extended or adjusted under 35 U.S.C. 154(b) by 0 days.

(21) Appl. No.: 15/474,959

(22) Filed: Mar. 30, 2017

(65) Prior Publication Data

US 2017/0282645 A1    Oct. 5, 2017

Related U.S. Application Data

(60) Provisional application No. 62/316,070, filed on Mar. 31, 2016.

(51) Int. Cl.
| | | |
|---|---|---|
| *B66F 3/00* | (2006.01) | |
| *B60B 29/00* | (2006.01) | |
| *B60Q 7/00* | (2006.01) | |
| *B60P 3/077* | (2006.01) | |
| *B60T 3/00* | (2006.01) | |

(52) U.S. Cl.
CPC ............ *B60B 29/001* (2013.01); *B60P 3/077* (2013.01); *B60Q 7/00* (2013.01); *B60T 3/00* (2013.01); *B66F 3/005* (2013.01)

(58) Field of Classification Search
USPC ........................ 254/129, 131, 131.5, 133 R
See application file for complete search history.

(56) References Cited

U.S. PATENT DOCUMENTS

| | | | |
|---|---|---|---|
| 2,135,802 A | * | 11/1938 | Dinkins ................ B60B 29/002 280/47.29 |
| 2,207,443 A | | 7/1940 | Schneider |
| 2,517,631 A | * | 8/1950 | Coleman ............... B60B 29/001 29/267 |
| 2,525,437 A | | 10/1950 | Winzler et al. |
| 2,543,276 A | | 2/1951 | Buechler |
| 2,546,509 A | | 3/1951 | Huff |
| 4,550,835 A | | 11/1985 | Lynch |
| 4,872,694 A | | 10/1989 | Griesinger |
| 5,176,487 A | | 1/1993 | Flitton |
| D349,385 S | | 8/1994 | Suggs, Sr. |
| 5,356,163 A | | 10/1994 | Suggs, Sr. |
| 5,562,389 A | | 10/1996 | Mitchell |
| 5,702,226 A | | 12/1997 | Pickle |
| 5,855,359 A | | 1/1999 | Chipperfield |
| 6,079,696 A | * | 6/2000 | Bette ....................... B66F 15/00 254/131 |

(Continued)

*Primary Examiner* — Joseph J Hail
*Assistant Examiner* — Shantese L McDonald
(74) *Attorney, Agent, or Firm* — Kammer Browning PLLC

(57) ABSTRACT

A hand lift system for positioning a wheel and tire to be placed on a vehicle hub, the system being made up of two primary components. A first paddle component provides a shovel shaped lever to be placed under the tire to be lifted up to the vehicle hub, with a handle grip to operate the lever arm. A second component provides a solid wedge chock on which the paddle component is placed to act as a fulcrum to the paddle component lever, or to act as a support once the tire is lifted to the appropriate height. The paddle component doubles as a tool for shifting the spare tire or flat tire into place. The chock component doubles as a wheel block for either a tire still on the vehicle or a spare tire that has been rolled to the side of the vehicle for use.

11 Claims, 6 Drawing Sheets

(56) References Cited

U.S. PATENT DOCUMENTS

| | | | |
|---|---|---|---|
| 6,106,214 A | 8/2000 | Saffelle et al. | |
| 6,378,191 B1* | 4/2002 | County | B66F 15/00 |
| | | | 269/904 |
| 6,382,644 B1 | 5/2002 | Rawlings | |
| D473,692 S | 4/2003 | Tafoya | |
| 6,726,516 B2* | 4/2004 | Sowry | A63H 23/10 |
| | | | 441/1 |
| 6,773,222 B1 | 8/2004 | Gilchrist | |
| 7,207,764 B1 | 4/2007 | Snook | |
| 7,334,804 B2 | 2/2008 | Mitchell et al. | |
| 7,367,546 B1 | 5/2008 | Rodriguez | |
| D589,224 S | 3/2009 | Kilpatrick | |
| D591,024 S | 4/2009 | Gammel et al. | |
| 7,699,576 B2 | 4/2010 | Campbell | |
| 7,708,516 B1 | 5/2010 | Snook | |
| 7,740,439 B1 | 6/2010 | Browning et al. | |
| 7,980,804 B2 | 7/2011 | Snook et al. | |
| 8,118,281 B1* | 2/2012 | Nolan | B66F 15/00 |
| | | | 254/119 |
| 8,567,763 B1 | 10/2013 | Nolan | |
| 8,870,197 B2 | 10/2014 | John | |

\* cited by examiner

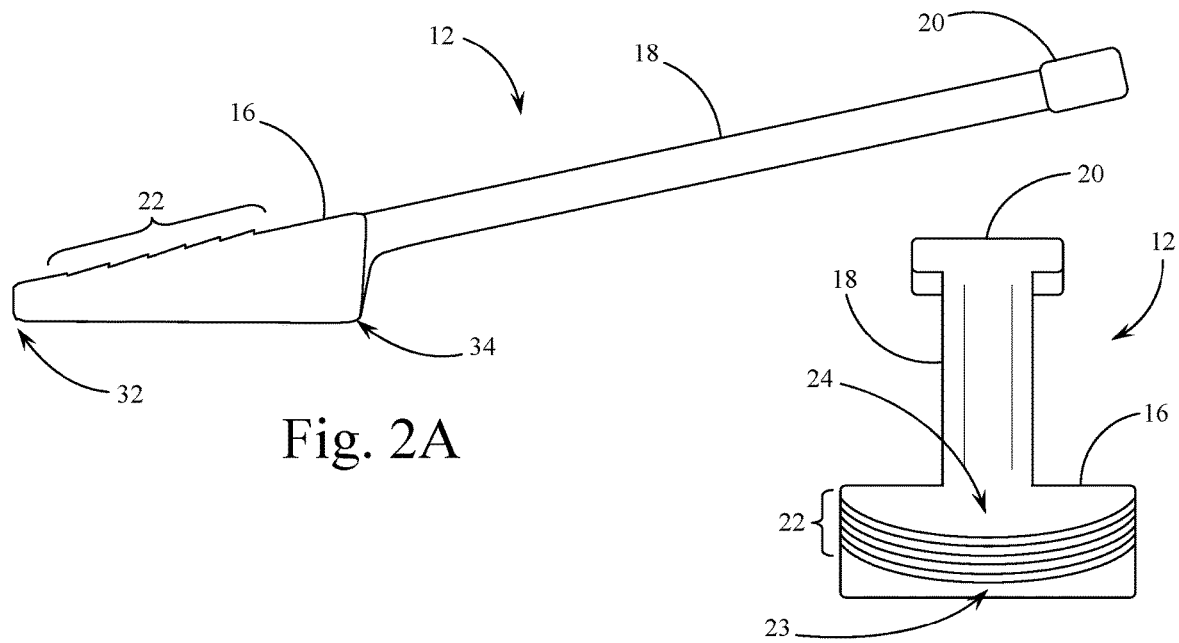
Fig. 2A
Fig. 2B
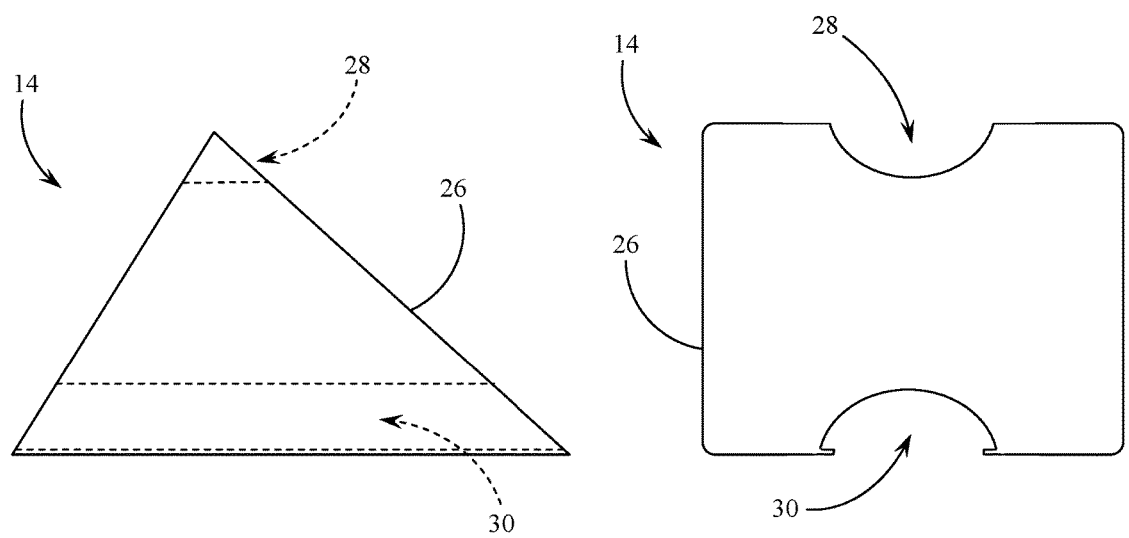
Fig. 3A
Fig. 3B

HAND LIFT SYSTEM FOR POSITIONING A WHEEL AND TIRE TO BE PLACED ON A VEHICLE HUB

CROSS REFERENCES TO RELATED APPLICATIONS

This application claims the benefit under Title 35 United States Code § 119(e) of U.S. Provisional Patent Application Ser. No. 62/316,070; Filed: Mar. 31, 2016; the full disclosure of which is incorporated herein by reference.

BACKGROUND OF THE INVENTION

1. Field of the Invention

The present invention relates generally to hand tools utilized with automobiles, trucks, and other wheeled vehicles. The present invention relates more specifically to tire changing tools, especially those that are manually operated and assist with changing tires on the roadside as opposed to in a shop.

2. Description of the Related Art

Most small to mid-size passenger automobiles and trucks provide spare tires that are carried on the vehicle such that a flat tire may be changed while the vehicle is on the side of the road or otherwise in a location where power tools and powered systems designed to change wheels and tires are unavailable. Most such passenger vehicles also minimally provide some tire changing tools, typically in kits made up of small compact lift jacks and lug nut wrenches. Changing a tire on the side of the road is a difficult process and requires some strength and skill, and the minimal tools typically provided with a motor vehicle only help so much to allow an individual to remove a flat tire and replace it with the spare tire.

The steps associated with changing a tire generally involve: lifting the vehicle with the jack; removing the lug nuts from the wheel with the flat tire; removing the flat tire from the vehicle; accessing and removing the spare tire from the vehicle; positioning and placing the spare tire on the now empty axle hub of the vehicle; securing the lug nuts back on the spare tire placed on the vehicle; lowering the vehicle; and removing the lift jack. Once again, most of these steps may be carried out by individuals of moderate strength as only a few of the steps involve lifting heavy objects. Because the wheels/tires involved in the process do roll, there are only a few steps that actually require lifting the heavy wheel/tire combination up off the ground and positioning it while elevated.

The typical lift jack tool is designed to allow an individual with relatively modest strength to raise the vehicle by turning or pumping the mechanical or hydraulic jack. Accessing and removing the spare tire from the vehicle also requires some lifting, but does not involve prolonged elevation of the heavy weight as the spare tire may be quickly set upon the ground where it may be rolled around to the position on the vehicle where the flat tire is located. Removing the flat tire from the vehicle generally does not require any significant lifting either, beyond placing the flat tire into the trunk of the vehicle. Tire tools with lug nut wrenches on one or more ends of the tire iron generally provide enough leverage that an individual of moderate strength is able to remove the lug nuts from the flat tire wheel and thereafter tighten the lug nuts on the spare tire once it has been placed on the vehicle.

Perhaps the most difficult stage of the process of changing a flat tire involves the proper placement, positioning, and lifting of the spare tire onto the hub of the vehicle, and simultaneously orienting the wheel in such a manner as to align each of the lug posts (4-8 typically) positioned on the hub. This step of positioning and placing the spare tire on the vehicle hub can be extremely difficult because it requires lifting the heavy wheel/tire combination up off of the ground at ground level while the individual is bending down, and turning or rotating the wheel while it is in an elevated position to orient the holes in the wheel aligning them for insertion of the wheel lugs.

To date, very little effort has been made in the industry to provide portable tools that facilitate this manual lifting and positioning of the spare tire in front of the empty wheel hub such that it might easily be placed on the wheel lugs and thereafter secured with the lug nuts. It would be desirable to have a tool or set of tools that facilitate the lifting of the wheel/tire four to six inches off of the ground in front of the wheel hub and thereafter retain it in position at such a height so that the individual changing the tire may move the tire slightly as needed in order to slide the wheel/tire onto the hub. It would be desirable if the tools used for this purpose were compact and could double as tools for other functions associated with either changing the tire or the safe operation and repair of a motor vehicle on the side of the road. It would be desirable if such tools or tool combinations were operable by an individual of modest strength by eliminating the need to hold a heavy wheel/tire combination above the ground for an extended period of time. It would be preferable if such a tool or set of tools were mechanically simple in their construction such that there was little chance of mechanical failure, even with use of the tools under rough conditions.

SUMMARY OF THE INVENTION

The present invention therefore provides a hand lift system for positioning a tire to be placed on a vehicle hub, the system being made up of two primary components. A first paddle component provides a shovel shaped lever that may at one end be placed under the spare tire to be lifted up to the vehicle hub and configured at a second end with a handle grip to allow the user to operate the lever arm and lift the spare tire to the desired height. A second component in the system provides a chock block made up of a solid wedge-shaped structure on which the paddle component may be placed to either act as a fulcrum to the lever arm of the paddle component, or to act as a supporting wedge, once the paddle component with the spare tire positioned thereon is lifted to the appropriate height. The paddle component of the system may double as a shovel type tool for the shifting and movement of either the spare tire into place or the flat tire into the trunk of the vehicle for transport. The chock component may double as a tire stop for either a vehicle tire still on the ground or for a spare tire that has been rolled to the side of the vehicle for use. The combined components of the hand lift system may be compactly nested together for storage in the vehicle in a secure location. Various other uses and advantages of the components of the hand lift system of the present invention will be apparent to those skilled in the art after the reading of the following detailed description and consideration of the appended drawings.

BRIEF DESCRIPTION OF THE DRAWINGS

FIGS. 2A & 2B are side and end elevational views, respectively, of the paddle component of the present invention.

FIGS. 3A & 3B are side and end elevational views, respectively, of the chock component of the present invention.

DETAILED DESCRIPTION OF THE PREFERRED EMBODIMENTS

Figure 1:
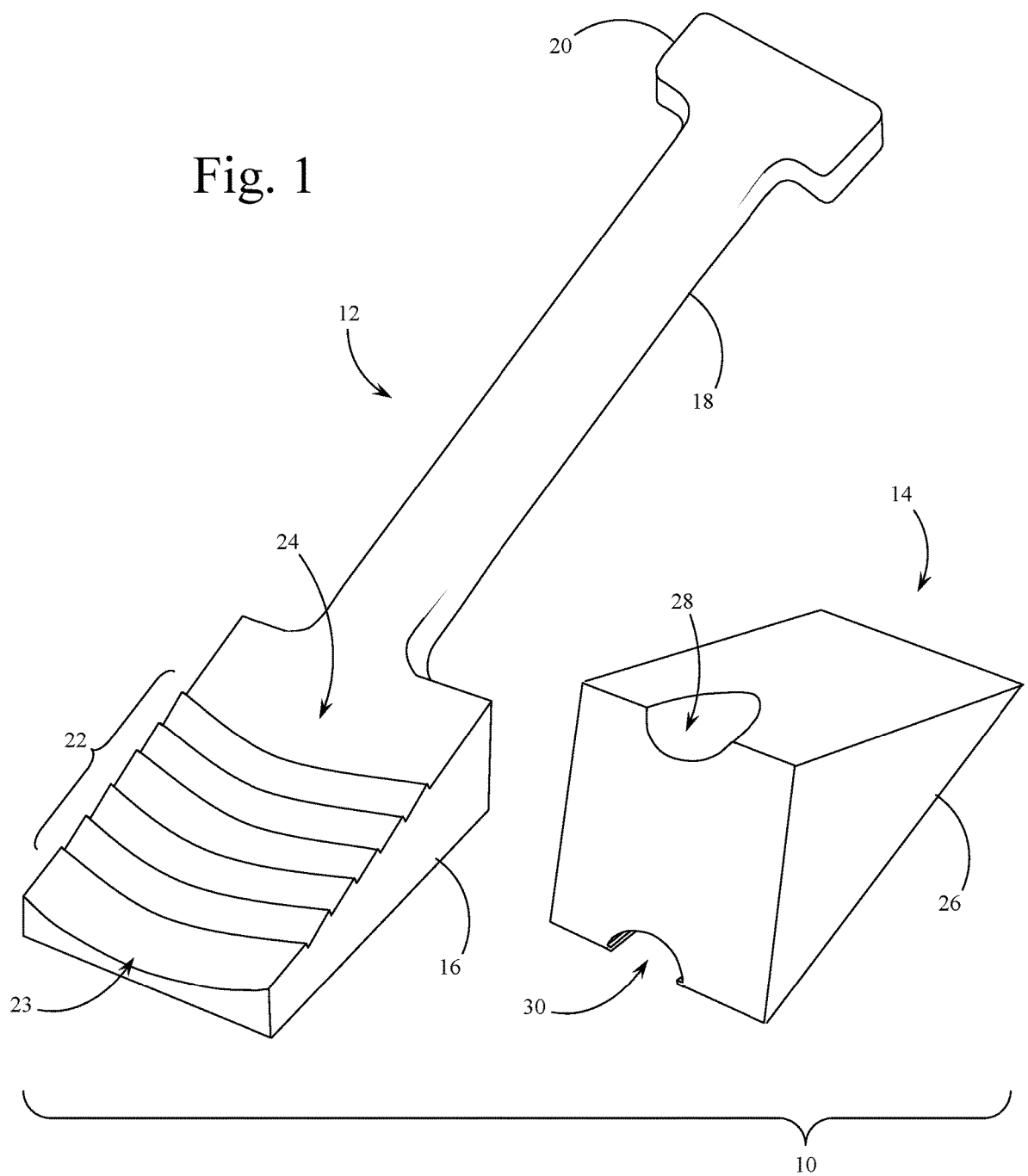
FIG. 1 is a perspective assembly view of the hand lift system of the present invention.

Reference is made first to FIG. 1 which is a perspective assembly view of the hand lift system of the present invention with the two primary components shown in approximate scale. Hand lift system 10 is primarily made up of paddle component 12 and chock component 14. Paddle component 12 is a generally shovel-shaped object formed with paddle blade portion 16, paddle handle portion 18, and paddle handle grip 20. Paddle blade portion 16 includes concave paddle face 24 as well as concave paddle blade edge 23. Across concave paddle face 24 is an array of paddle face ridges 22. The functionality of the concavity of paddle blade portion 16 and the use of ridges 22 is described in more detail below. Preferably, paddle component 12 is made of a lightweight, but strong material such as aluminum or heavy polymer resin. If paddle component 12 is made from a lighter polymer resin or plastic type material, then paddle handle portion 18 should be internally structured so as to minimize bending of the handle along its length.

The second primary component of hand lift system 10, namely, chock component 14, is a simple triangular block structure constructed of chock block 26 with chock fulcrum channel 28 positioned at the apex of the triangular block, and chock paddle storage channel 30 positioned through and along the bottom face of the triangular block opposite chock fulcrum channel 28. Here again, the functionality of these two channels formed in chock block 26 are described in more detail below.

Reference is next made to FIGS. 2A & 2B for a detailed description of the structure of a first preferred embodiment of paddle component 12. In FIG. 2A, paddle component 12 is shown in a side elevational view with paddle blade portion 16 positioned flat on a horizontal surface (on its base) with paddle handle portion 18 extending at an angle upward to paddle handle grip 20. Paddle face ridges 22 are seen in profile on the top angled surface of paddle blade portion 16. Along the base of paddle blade portion 16, again as positioned flat on a horizontal surface, are direct lift pivot point 32 and lever lift pivot point 34. As described in more detail below, the use of paddle component 12 may be carried out by lifting paddle handle grip 20, thereby pivoting paddle component 12 on direct lift pivot point 32. Alternately, the user may push down on paddle handle grip 20 to effect a pivoting of paddle component 12 on lever lift pivot point 34. This first preferred embodiment of paddle component 12 is structured such that the base of paddle blade portion 16 will lay flat on a horizontal surface (the ground adjacent the vehicle) while paddle handle portion 18 is elevated above that horizontal surface such that the user may easily grasp and lift or push down on paddle handle grip 20.

FIG. 2B is an elevational end view of paddle component 12 with concave paddle blade edge 23 in the foreground extending back to paddle handle grip 20 in the background. Paddle blade portion 16 is again shown to include concave paddle face 24 with paddle face ridges 22. Paddle handle portion 18 extends back to paddle handle grip 20. The concave structure of paddle blade portion 16 facilitates both the insertion of paddle component 12 under the spare tire to be handled, and the retained centering of the spare tire on the concave paddle face 24. Paddle face ridges 22 facilitate the retention of the spare tire up and back on the surface of concave paddle face 24 by preventing slippage of the tire down the face of the paddle.

Reference is next made to FIGS. 3A & 3B for a detailed description of chock component 14 of the hand lift system 10 of the present invention. As described above, chock component 14 is a generally triangular shaped block having two triangular side faces and three rectangular end faces. Chock block 26 includes triangular side faces that preferably do not form isosceles triangles. That is, it is preferable that the two rectangular upper faces of chock block 26 be of different sizes and that the angle of inclination for each of these upward oriented faces be slightly different to provide greater versatility with the orientation of chock component 14 to produce a higher or lower angle of inclination to paddle component 12 as described in more detail below. In the side view of FIG. 3A, the triangular sides of chock block 26, and the differences between the two upper faces, both in size and in angle of inclination, can be seen. Shown in broken line form within the structure of chock block 26 are chock fulcrum channel 28 positioned along the apex edge, and chock paddle storage channel 30 positioned along and through the flat base of chock block 26.

FIG. 3B shows the two inserted channels in greater detail with chock paddle storage channel 30 being seen as a longitudinal channel having a half-moon cross section into which the paddle handle portion 18 of paddle component 12 may be inserted. Chock fulcrum channel 28 is a smaller channel positioned on the apex of the block that serves to retain paddle handle portion 18 when paddle component 12 is in use with chock component 14.

Figure 4:
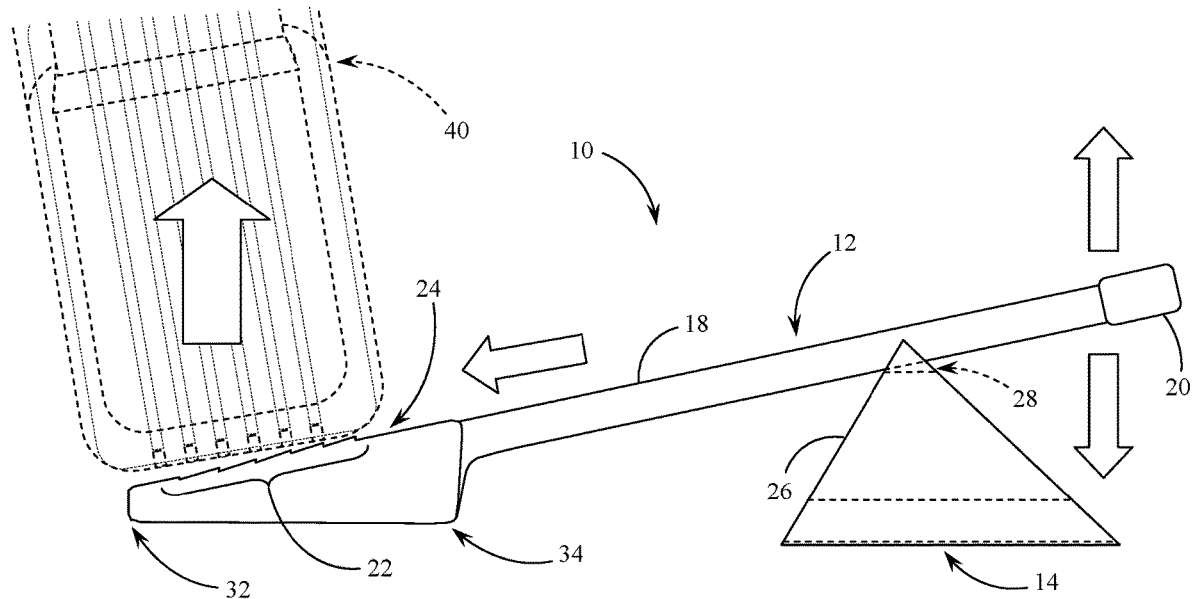
FIG. 4 is a side elevational assembly view showing the hand lift system of the present invention being initially positioned to lift a tire.
Figure 5:
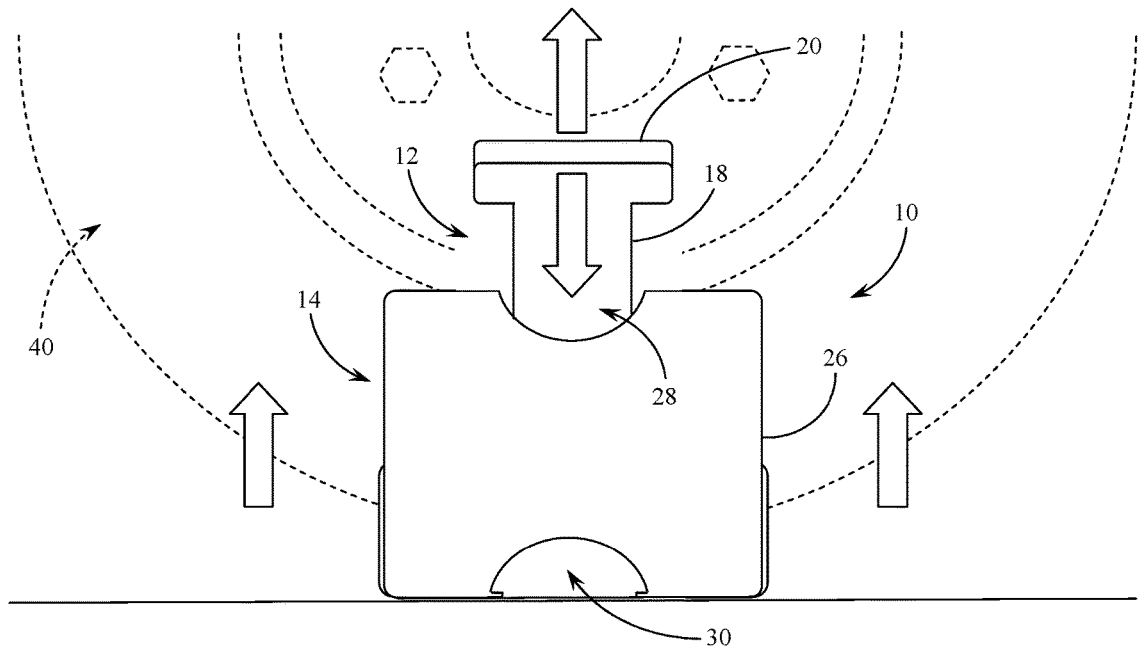
FIG. 5 is an end elevational assembly view of the hand lift system of the present invention being initially positioned to lift a tire.
Figure 6:
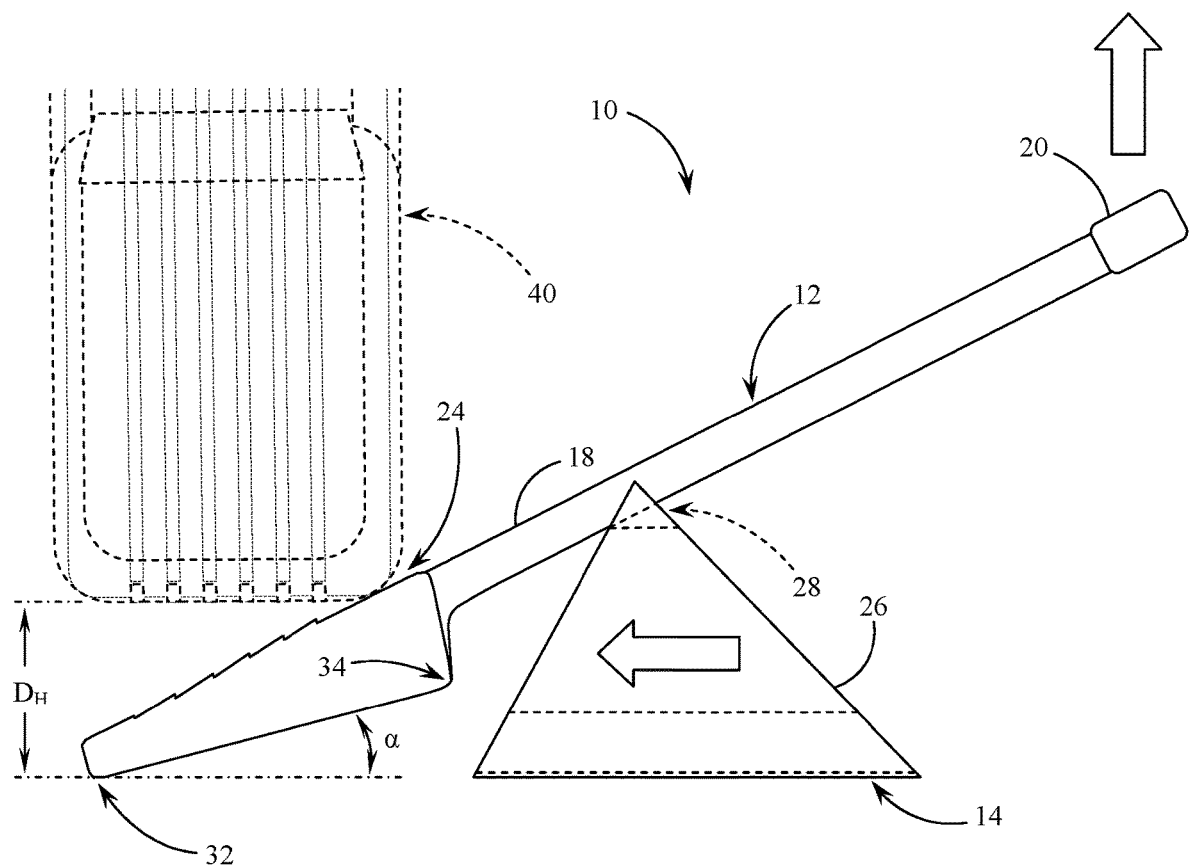
FIG. 6 is a side elevational assembly view showing the hand lift system of the present invention after having lifted the tire into position and thereafter holding the tire at the appropriate height in front of the empty wheel hub.

Reference is next made to FIGS. 4-6 for a description of the manner of using the tool components of the hand lift system of the present invention. FIG. 4 is a side elevational assembly view showing the initial manner of placing paddle component 12 on the horizontal surface of the ground, and moving wheel/tire 40 into position, typically by rolling the tire on top of concave paddle face 24 or by wedging the front edge of concave paddle blade edge 23 under the edge of the tire. However, wheel/tire 40 is placed on concave paddle face 24, paddle component 12 remains on the ground in the position shown in FIG. 4. No lifting of wheel/tire 40 has thus far been required.

Once wheel/tire 40 is positioned on paddle blade portion 16, chock component 14 may be positioned under paddle component 12 by receiving paddle handle portion 18 into chock fulcrum channel 28. Chock block 26 may be slid under paddle component 12 up to the point of contact as shown in FIG. 4, again without requiring any lifting of paddle component 12 from its position on the horizontal ground surface. Once arranged as shown in FIG. 4, the user may carry out a number of actions to effect the lifting of wheel/tire 40. Paddle component 12 maybe shoved further under wheel/tire 40 to slightly lift the tire and place it more completely on concave paddle face 24. Alternately, the user may push down on paddle handle grip 20 using chock component 14, by way of chock fulcrum channel 28, as the lever pivot point for this action in a manner that lifts wheel/tire 40. It should be noted that even without the placement of chock component 14 as shown in FIG. 4, paddle component 12 by way of the same lever action (that is, pushing down on paddle handle grip 20) will effect a similar lifting of wheel/tire 40 by the pivoting of paddle blade portion 16 on lever lift pivot point 34. This motion and the slight lifting of wheel/tire 40 results from the inclined angle that paddle handle portion 18 forms with the horizontal ground surface and the wedge shape of paddle blade portion 16.

More commonly, and preferably, the user will lift paddle handle grip 20 up away from the ground, pivoting on direct lift pivot point 32 of paddle blade portion 16. The user may carry out this handle grip lifting action prior to, or as chock component 14 is positioned in place beneath paddle component 12, or may do so simply to initially position wheel/tire 40 adjacent the wheel hub of the vehicle. The use of paddle component 12 is preferably that associated with lifting paddle handle grip 20 rather than the alternate use of it as a lever. The use of chock component 14 as a fulcrum for a lever handle is secondary to being used as a supporting chock block for paddle component 12.

FIG. 5 is an end view of the hand lift system of the present invention arranged as shown in FIG. 4, looking over the system toward the wheel/tire 40 initially positioned in front of the wheel hub. In this view, paddle handle portion 18 of paddle component 12 is shown resting within chock fulcrum channel 28 on chock block 26. Once again, paddle handle grip 20 may be utilized by pushing down on the handle grip using chock block 26 as a pivot point for the lever lifting action, or by lifting up on paddle handle grip 20 to remove it from contact with chock block 26, thereby allowing the block to be slid further under paddle handle portion 18.

Reference is next made to FIG. 6 which provides a side elevational assembly view of the hand lift system 10 of the present invention shown with wheel/tire 40 appropriately positioned at a height distance $D_H$ suitable for moving the wheel/tire 40 onto the wheel hub. The arrangement shown in FIG. 6 results from the preferable action associated with the handling of paddle component 12 whereby the user lifts paddle handle grip 20 up and directs chock component 14 towards the vehicle, thereby supporting paddle handle portion 18 (within chock fulcrum channel 28) in its elevated position.

This stable support arrangement shown in FIG. 6 is accomplished by contact between direct lift pivot point 32 on paddle blade portion 16 with the ground, and by the support of paddle handle portion 18 within chock fulcrum channel 28 of chock component 14. This stable positioning may be fine-tuned by modest adjustments made by the user through the lifting of paddle handle grip 20 and the repositioning of chock component 14 beneath paddle component 12 and/or the lever lifting of paddle blade portion 16 by pushing downward on paddle handle grip 20. Either of these two actions allows for fine adjustments to the height of wheel/tire 40 and its side-to-side placement in front of the wheel hub. Once in this stable position, the user may then easily handle wheel/tire 40 onto the wheel hub by making slight rotations of the wheel and by pushing it forward onto the wheel lugs on the hub. Such minor adjustments will not require any significant lifting or holding of wheel/tire 40 in its elevated position, and are generally easy to make as the final minor adjustments to placement of the spare tire onto the vehicle.

Figure 7:
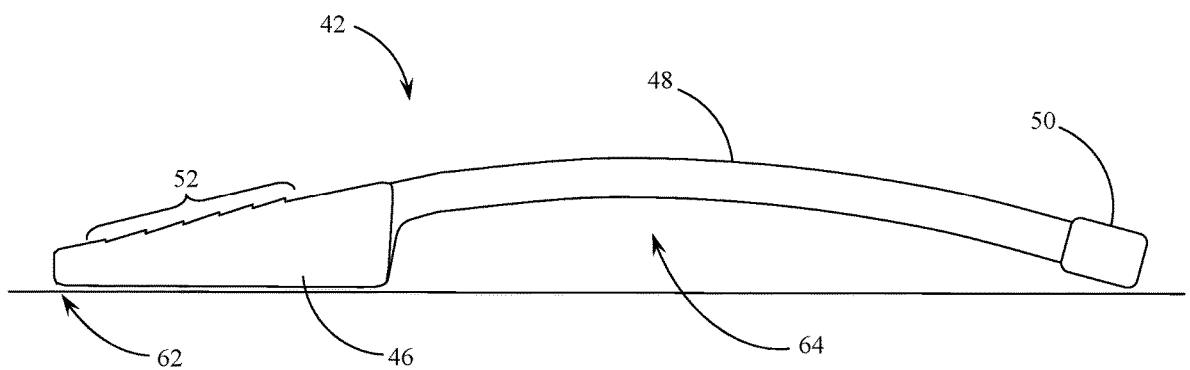
FIG. 7 is a side elevational view of an alternate preferred embodiment of the paddle component of the present invention.

Reference is next made to FIG. 7 for an alternate embodiment of the paddle component of the present invention. Paddle component 42 as shown in FIG. 7 includes paddle curved handle portion 48 that in part allows the paddle component to be constructed of a resilient resin material, whereby the handle portion may bend slightly during use without altering the effectiveness of the paddle component as described above. With the structure of paddle component 42 shown in FIG. 7, the placement of the tool on the horizontal surface of the ground as shown, continues to position paddle blade portion 46 flat on the ground surface, including direct lift pivot point 62. Paddle face ridges 52 remain essentially the same and are shown in profile in FIG. 7. Most importantly, paddle curved handle portion 48 continues to provide access beneath the handle, even when the component is placed flat on the ground, by way of handle grapple space 64 underneath the curved portion of the handle.

Paddle handle grip 50 makes initial contact with the ground in this embodiment but only by way of the curve of the handle extending back to the horizontal ground surface. The embodiment shown in FIG. 7 provides a few advantages to the user, both in terms of flexibility of the handle portion of the paddle component, and in terms of the initial placement of the tire onto the paddle blade portion 46. Those skilled in the art will recognize that the arrangement shown in FIG. 4 may be difficult to obtain without the initial placement of chock component 14 under paddle component 12 therein. Depending upon the weight of the handle portion, the slope of the ground surface, and the position of the handle grip of paddle component 12, it may be difficult to maintain paddle blade portion 16 with its flat horizontal base in full ground contact. The embodiment shown in FIG. 7 solves this potential problem by insuring that the flat base of paddle blade portion 46 is fully in contact with the ground surface simply because paddle handle grip 50 is at the same level. Handle grapple space 64 still allows the user easy access to manipulation of paddle component 42 as needed.

Use of paddle component 42 as shown in FIG. 7 is essentially the same as use of the straight handled embodiment shown in FIG. 4 with the exception of the initial lack of a lever motion due to paddle handle grip 50 already being in contact with the ground surface. Nonetheless, paddle curved handle portion 48 may be lifted by the user in the same manner that the straight handled portion may be lifted as described above with respect to FIG. 4.

Figure 8:
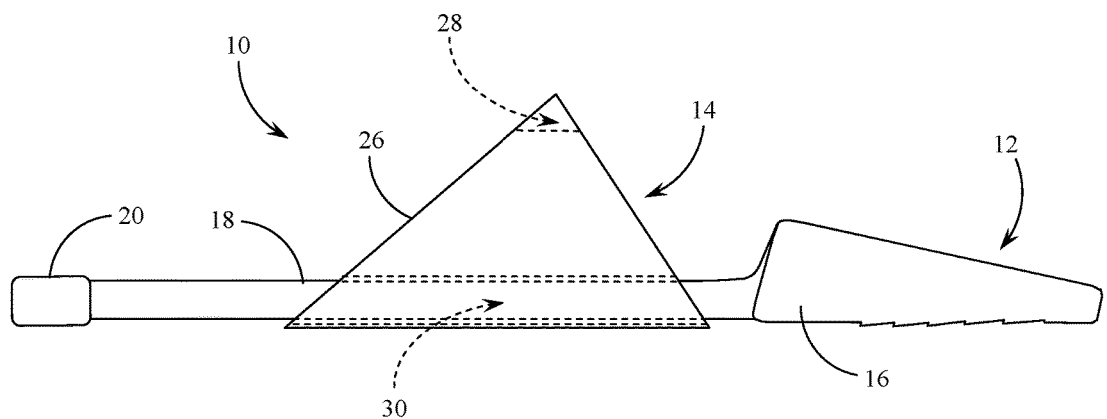
FIG. 8 is a side elevational assembly view of the hand lift system of the present invention configured for storage within the vehicle.

Reference is next made to FIG. 8 for a detailed description of the manner in which paddle component 12 may be nested and stored within chock component 14 so as to maintain the components together and create a compact arrangement for storage in the vehicle. In this assembly, paddle component 12 is oriented downward with paddle blade portion 16 facing away from the bulk of chock block 26. In this manner, paddle handle portion 18 may be pressed into chock paddle storage channel 30 on the large base face of chock block 26 on chock component 14. Reference is made back to FIG. 3B wherein chock paddle storage channel 30 is shown to include extended resilient edges that allow paddle handle portion 18 to be popped into the storage channel and retained therein. The storage channel shown in FIG. 8 facilitates not only the availability of the two components within the hand lift system when needed, but the easy storage of the components in an out of the way location in the trunk or under the seat of the motor vehicle.

Figure 9:
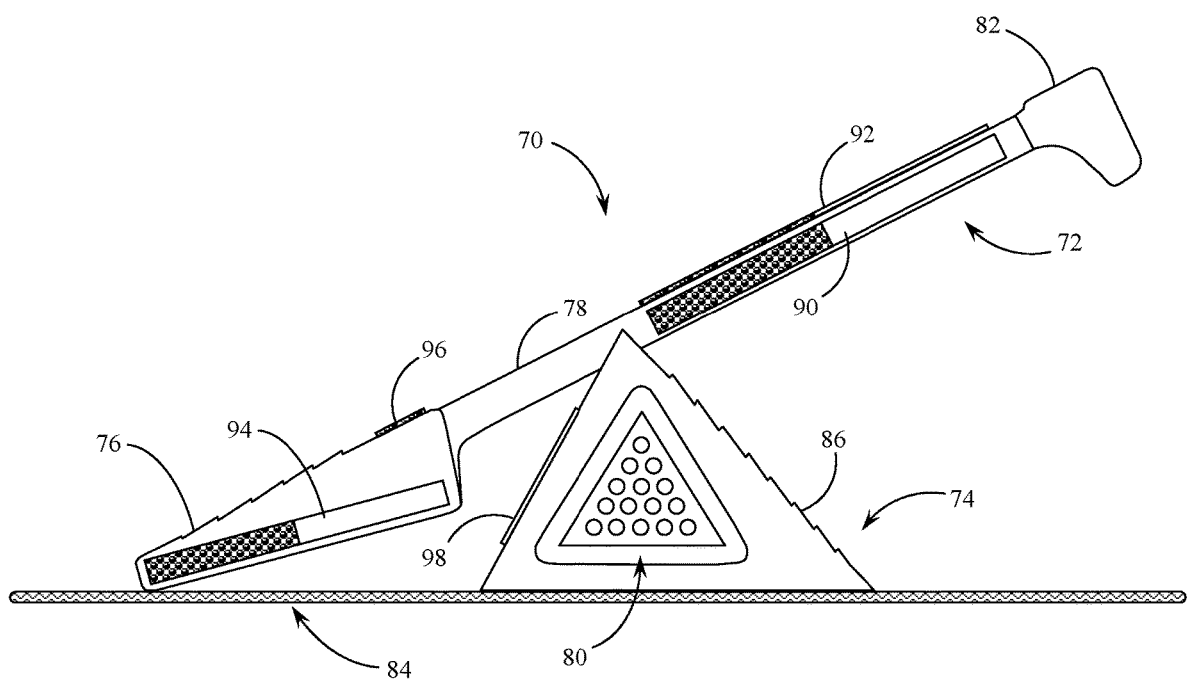
FIG. 9 is a side elevational assembly view of further alternate preferred embodiments of the paddle component and the chock component of the present invention.

Reference is finally made to FIG. 9 which provides a side elevational assembly view of an alternate structure for the hand lift system 70 of the present invention shown ready for use adjacent the vehicle. As with the arrangement shown in FIG. 6, the arrangement of FIG. 9 results from establishing the preferable orientation associated with the handling of paddle component 72 whereby the user lifts paddle handle grip 82 up and directs chock component 74 towards the vehicle, thereby supporting paddle handle portion 78 (within the chock fulcrum channel) in its elevated position.

The embodiment shown in FIG. 9 adds a number of features to the basic structure of each of the components in the hand lift system 70. Paddle component 72 incorporates an alternate structure for paddle handle grip 82 that achieves the same functionality as the alternate embodiment shown in FIG. 7. With the extended paddle handle grip 82 structured as shown in FIG. 9, paddle component 72 may be placed flat on the ground and still retain an elevated gap with the ground that allows the user to easily pick up the paddle component. In addition, paddle component 72, as shown in FIG. 9, incorporates a number of reflective surfaces that improve the safe use of hand lift system 70 when operated on the side of the road, especially at night. Reflective surfaces 90 & 92 are positioned along the length of the handle portion 78 of paddle component 72. Additional reflective surfaces 94 & 96 are positioned on the side of paddle blade portion 76 as shown.

Similar additions are made to chock component 74 positioned beneath paddle component 72 that improve the safe use of the system, especially at night. Reflective surface 98 is positioned on a forward facing surface of chock component 74, primarily benefiting the use of chock component 74 as a wheel chock rather than as a fulcrum in the system. When used as a fulcrum in the manner shown in FIG. 9, LED light triangle 80 may be activated to both provide light to the immediate work area and to alert passing drivers to the roadside activity. A second LED light triangle (not shown) is preferably positioned on the opposite side of chock component 74 shown in FIG. 9.

A number of additional improvements to the basic system of the present invention are also disclosed in FIG. 9. Chock component 74 incorporates a ridged face 86 (similar in some respects to the ridged face of paddle blade portion 76) that facilitates use of chock component 74 against a tire in its alternate application as a wheel chock. Also shown in FIG. 9 is work mat 84 which in the preferred embodiment is a foldable padded mat that the user may position adjacent the vehicle to the side of the wheel/tire to be accessed and changed. In addition to covering sharp objects, rocks, and mud that may be present on the side of the road, mat 84 helps maintain the various components of the system clean during use, and may further serve as a wrap or fabric envelope for containing the components of the system when not in use. Various structures for mat 84 are anticipated that include pockets and wrap ties to secure the components together within the flexible container when not in use.

Additional elements to a kit that may be provided to the user of the vehicle would preferably include a pair of gloves (not shown) and an ancillary battery powered work light (not shown) with a magnetic mount that may be positioned above the wheel area when the system of the present invention is being used. Therefore, while the basic components of the system of the present invention include the paddle component and the chock component, additional components, preferably included in a compact vehicle kit, would include the work space mat, a pair of gloves, and a magnetic mount light source. Because of the dual use of the chock component as both a fulcrum point and a wheel chock, a second and third chock component may be provided within a deluxe kit for the system of the present invention.

Although the present invention has been described in connection with a number of preferred embodiments, those skilled in the art will recognize modifications to the components described that still fall within the spirit and scope of the invention. The materials from which the components are constructed may vary significantly, depending in part on the size of the vehicle, and therefore the size of the wheel/tire used on the vehicle. In other words, a small compact car may require a smaller version of the hand lift system of the present invention, whereas a large pickup truck may require a larger version of the system. The overall size of the individual components may vary depending on the vehicle size application as well as the material from which the components are constructed. A small compact car, for example, may achieve the functionality of the present invention through the use of heavy duty resin components, whereas a large pickup truck might benefit from an aluminum paddle component with a hard rubber chock component. In any case, variations in both the size of the components and in the materials from which the components are constructed are anticipated.

I claim:

1. A hand lift system for a user to lift and position a tire to be placed on a vehicle hub, the system comprising:
   a paddle component comprising:
     a paddle blade portion engaging the tire to be lifted; and
     a paddle handle portion engaged by the user; and
   a chock component comprising a triangular block having a flat base and an opposing apex edge, the flat base of the chock component further comprising a storage channel sized to receive and retain the paddle handle portion of the paddle component when the system is not in use and is being stored;
   wherein the user, engaging the paddle handle, lifts and positions the tire and positions the apex edge of the chock component under the paddle component to support and position the tire on the vehicle hub.

2. The system of claim 1 wherein the paddle component further comprises a paddle handle grip portion positioned at an end of the paddle handle portion distal to the paddle blade portion.

3. The system of claim 2 wherein the paddle handle portion has a longitudinal axis and the paddle blade portion and the paddle handle grip portion each extend in part away from the longitudinal axis such that when the paddle component is placed on a flat surface, and the tire is placed on the paddle blade portion, the paddle blade portion and the paddle handle grip portion support the paddle handle portion above the flat surface allowing the user to easily pick up the paddle component with the tire positioned thereon.

4. The system of claim 1 wherein the apex edge of the chock component further comprises a fulcrum channel, the fulcrum channel sized and positioned to receive and partially retain the paddle handle portion of the paddle component when the system is in use.

5. The system of claim 1 wherein the paddle blade portion of the paddle component further comprises an array of support ridges, the array of support ridges helping to retain the tire when positioned on the paddle blade portion.

6. The system of claim 1 wherein the paddle blade portion of the paddle component comprises an upward oriented face for contact with the tire, the upward oriented face defining a concave profile to facilitate the retention of the curved face of the tire thereon.

7. The system of claim 1 wherein at least one of the paddle component and the chock component further comprises one or more reflective surfaces oriented to reflect lights from other vehicles thereby facilitating the safe use of the system on the side of a road at night.

8. The system of claim 1 wherein the chock component further comprises first and second angled faces extending between the flat base and the apex edge, at least one of the angled faces comprising an array of support ridges, the array of support ridges helping to maintain the chock component in place when used as a wheel chock.

9. The system of claim 1 wherein the chock component further comprises first and second triangular faces extending between the flat base and the apex edge, and the system further comprises at least one battery powered LED light array positioned on at least one of the triangular faces, the LED light array providing illumination for a work area around the system and a warning light to alert oncoming traffic of use of the system on a side of the road.

10. A hand lift system for a user to lift and position a tire to be placed on a vehicle hub, the system comprising:
   a paddle component comprising:
      a paddle blade portion engaging the tire to be lifted, the paddle blade portion comprising an array of support ridges, the array of support ridges helping to retain the tire when positioned on the paddle blade portion;
      a paddle handle portion extending from the paddle blade portion; and
      a paddle handle grip portion engaged by the user; and
   a chock component comprising a triangular block having a flat base and an opposing apex edge, the apex edge comprising a fulcrum channel, the fulcrum channel sized and positioned to receive and partially retain the paddle handle portion of the paddle component when the system is in use, the flat base of the chock component further comprising a storage channel sized to receive and retain the paddle handle portion of the paddle component when the system is not in use and is being stored, the chock component further comprising first and second angled faces extending between the flat base and the apex edge, at least one of the angled faces comprising an array of support ridges, the array of support ridges helping to maintain the chock component in place when used as a wheel chock;
   wherein the user, engaging the paddle handle, lifts and positions the tire and positions the apex edge of the chock component under the paddle component to support and position the tire on the vehicle hub.

11. A kit carried onboard a motor vehicle comprising hand lift system to assist a user with changing a wheel and tire on the motor vehicle, the kit comprising:
   a paddle component comprising a blade, a lever arm, and a grip handle, the blade engaging the wheel and tire to be lifted, the lever arm extending from the paddle, and the grip handle positioned at the end of the lever arm distal to the blade;
   a chock component comprising a triangular block having a flat rectangular base, an opposing apex edge, first and second angled faces and first and second triangular faces extending between the flat rectangular base and the apex edge;
   a combination work area mat and system storage bag; and
   at least one battery powered light source removably securable to at least one of the chock component, the paddle component, and the motor vehicle adjacent the wheel and tire to be changed;
   wherein the user removes and positions the components of the kit and a spare tire in an area adjacent the wheel and tire to be changed, positions the spare tire on the blade of the paddle component, engages the paddle handle, lifts and positions the tire in front of the vehicle hub, and positions the apex edge of the chock component under the paddle component to support and position the tire on the vehicle hub.

\* \* \* \* \*